Dec. 16, 1952 G. A. DUBOIS 2,621,589
OUTFIT FOR THE PACKING OF DEHYDRATED FRUITS
AND VEGETABLES OR OTHER APPLICATIONS
Filed July 31, 1947 8 Sheets-Sheet 1

INVENTOR
GEORGES A. DUBOIS
By Young, Emery & Thompson
Attys.

Dec. 16, 1952 G. A. DUBOIS 2,621,589
OUTFIT FOR THE PACKING OF DEHYDRATED FRUITS
AND VEGETABLES OR OTHER APPLICATIONS
Filed July 31, 1947 8 Sheets-Sheet 2

INVENTOR
GEORGES A. DUBOIS
By Young, Emery & Thompson
Attys.

INVENTOR
GEORGES A. DUBOIS

Dec. 16, 1952                G. A. DUBOIS                2,621,589
OUTFIT FOR THE PACKING OF DEHYDRATED FRUITS
AND VEGETABLES OR OTHER APPLICATIONS
Filed July 31, 1947                              8 Sheets-Sheet 5
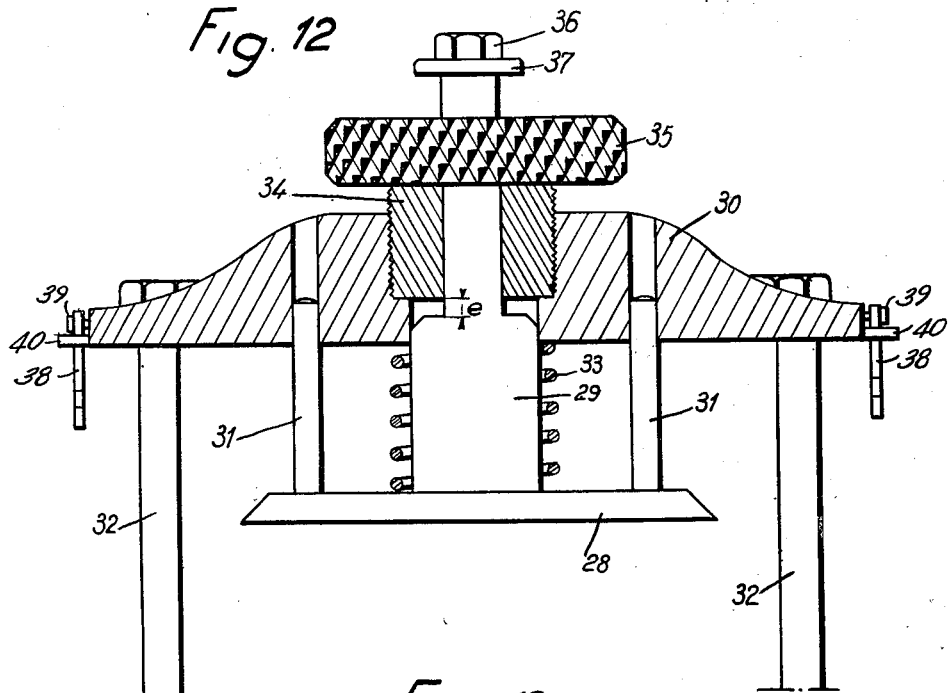
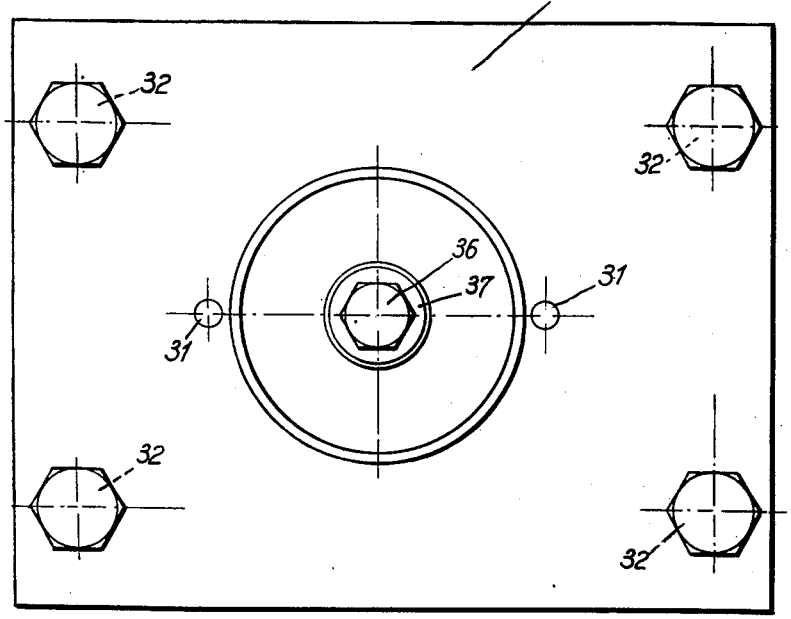

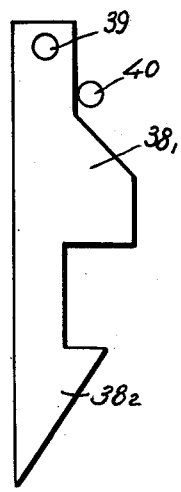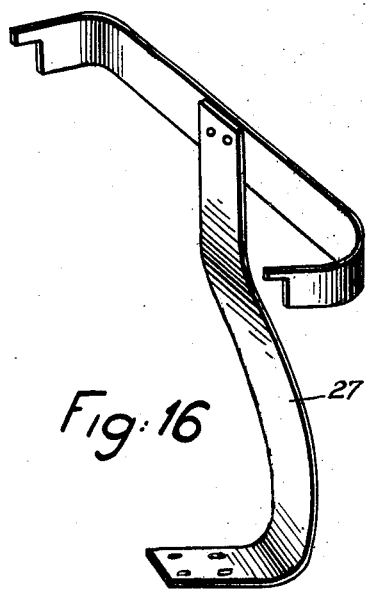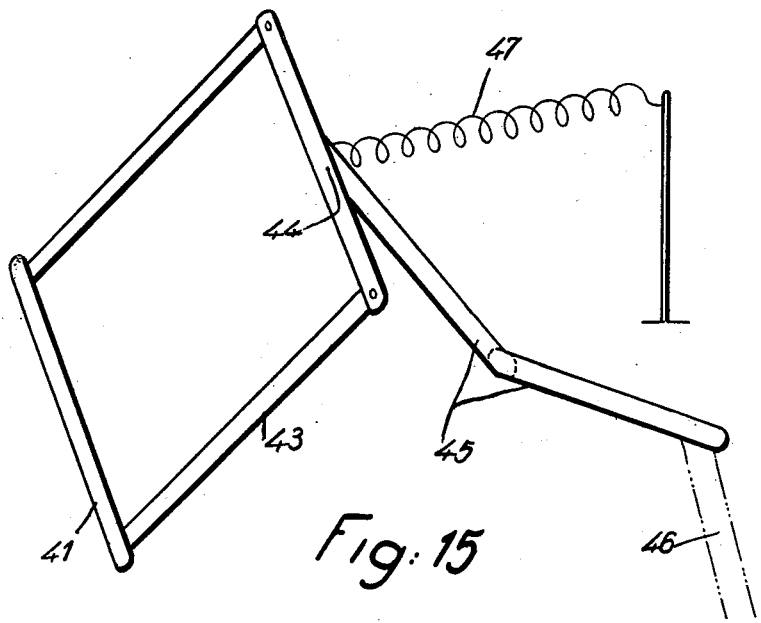

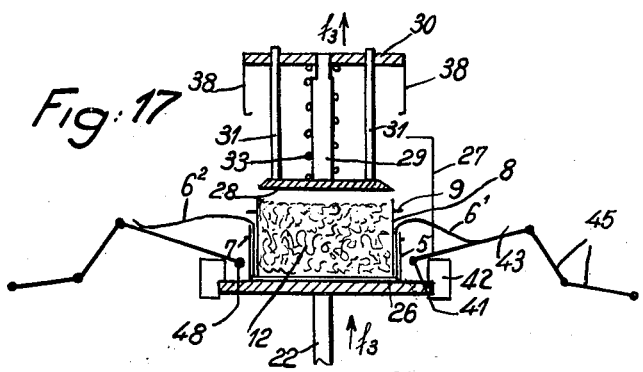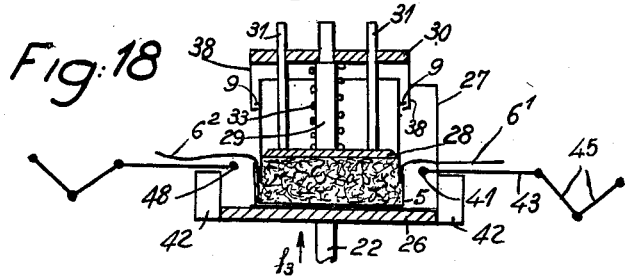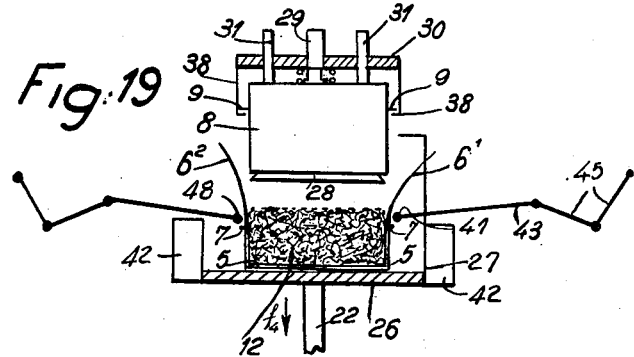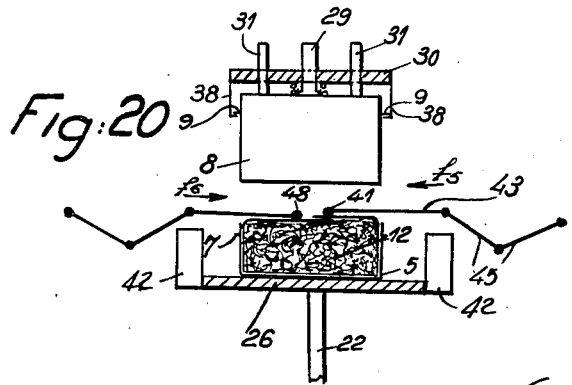

Dec. 16, 1952　　　　　G. A. DUBOIS　　　　2,621,589
OUTFIT FOR THE PACKING OF DEHYDRATED FRUITS
AND VEGETABLES OR OTHER APPLICATIONS
Filed July 31, 1947　　　　　　　　　　8 Sheets-Sheet 8

INVENTOR
GEORGES A. DUBOIS
BY Young, Emery & Thompson
ATTYS.

Patented Dec. 16, 1952

2,621,589

UNITED STATES PATENT OFFICE 2,621,589

OUTFIT FOR THE PACKING OF DEHYDRATED FRUITS AND VEGETABLES OR OTHER APPLICATIONS

Georges Albert Dubois, Asnieres, France

Application July 31, 1947, Serial No. 765,038
In France May 20, 1942

Section 1, Public Law 690, August 8, 1946
Patent expires May 20, 1962

1 Claim. (Cl. 100—251)

One presently uses, for the packing of dehydrated fruits and vegetables, molds shown in Figures 1, 2 and 3 of the appended drawings which are respectively a perspective view of the mold and two sectional views of said mold through the line II—II of Figure 1, said sectional views corresponding to two successive phases of the manufacture.

Said mold is formed of a base 1 on which a packing sheet 2, of cellulosic material, for example, is placed, then both halves $3^1$, $3^2$ of the mold are put in position and come to rest upon the sheet 2 of cellulosic material and clamp it onto the base 1.

Then the so formed mold is filled (Figure 2) whereafter the withdrawing from the mold is effected (Figure 3); the edges $2^1$, $2^2$ of the cellulosic sheet 2 are turned up so as to entirely wrap the cake of dehydrated fruits and vegetables; both edges $2^1$, $2^2$ come to lie upon each other (Figure 3); it is then possible to fasten both said edges on each other by any suitable means as, for example by gluing or sticking; the cellulosic sheet is turned up on the ends of the cake for achieving the packing; the cake is completely packed in the cellulosic sheet and can easily be put on the market.

This known method shows various drawbacks and more particularly the following ones:

(1) It requires multiple manipulations, more particularly for withdrawing the cake from the mold.

(2) The compression of the cake is not obtained in a sufficiently regular manner.

(3) The cake of dehydrated fruits and vegetables adheres to the walls $3^1$, $3^2$ of the mold which renders the withdrawing from the mold and the releasing of the cake difficult.

The present invention has for its object more particularly to avoid the preceding drawbacks. It first relates, in an outfit for the packing of dehydrated fruits and vegetables or other applications, to a mold characterized by a gauge receiving the packing sheet such as a cellulosic material and a frame encased in said gauge and clamping the packing sheet therein so as to turn up said sheet on all sides which makes it possible to introduce into and to press in the mold the product to be packed, then to remove the frame, the compressed cake being maintained by the sides of the gauge and being then in contact only with the packing sheet; finally the turned up edges of the sheet are turned down and applied on the cake, the packing being thus achieved.

The invention also relates to a press receiving the preceding molds or other similar molds and successively insuring the compression of the product in the mold and then the folding of the packing sheet onto the compressed cake.

The invention also relates to a folding machine characterized by folding members for folding the edges of the packing sheet at the end of the gauge and members insuring the automatic withdrawing of the cake from the mold and the expelling of the gauge, which makes it possible to obtain a compressed cake packed in a tight sheet and ready for being put in the market.

The invention also relates to numerous other characteristic features which will be described hereinafter and to their various combinations.

An outfit made in accordance with the invention for packing dehydrated fruits and vegetables is shown by way of example in the appended drawings, in which:

Figure 6 is a perspective view, on a larger scale, showing a corner of the gauge and the fold formed by the cellulosic sheet outside this corner.

Figure 12 is a sectional view showing the device adjusting the position of the stop for the upper plate of the press.

Figure 13 is a plan view corresponding to Figure 12.

Figure 14 is a detail elevational view showing one of the retaining members for the frame of the press after compression of the cake.

Figure 15 is a perspective view showing a roll for closing the package and its control device.

Figure 16 is a perspective view showing a fork actuated by the upper plate of the press and controlling the retaining hooks.

Figures 17 to 20 are four diagrams explaining the various phases of the operation of the press.

Figure 1:
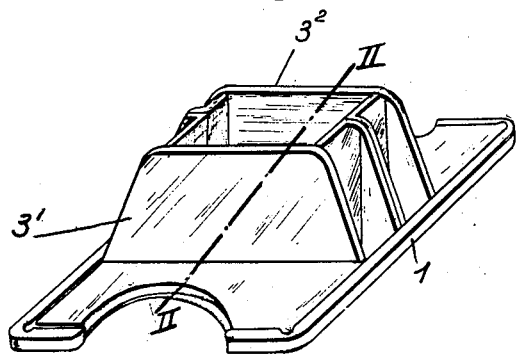
Figure 2:
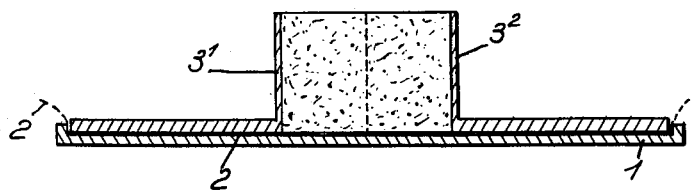
Figure 3:
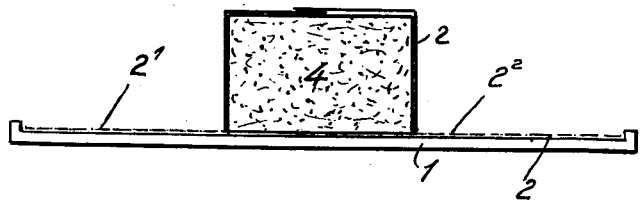
Figure 4:
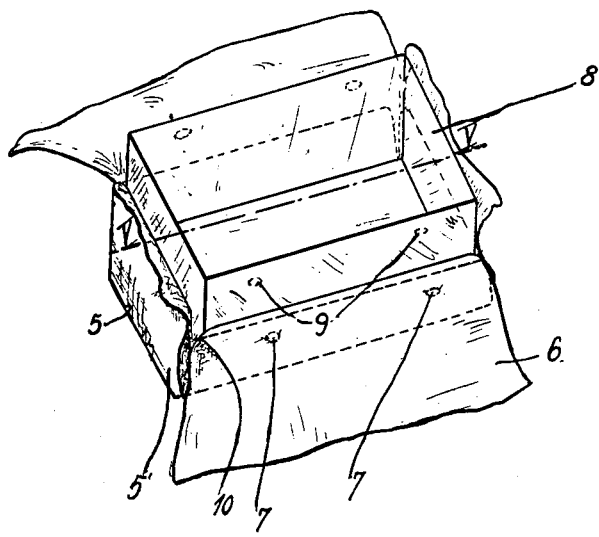
Figure 4 is a perspective view showing a mold made in accordance with the invention, the sheet of cellulosic material serving for the packing being clamped against the gauge and the frame of the mold.
Figure 5:
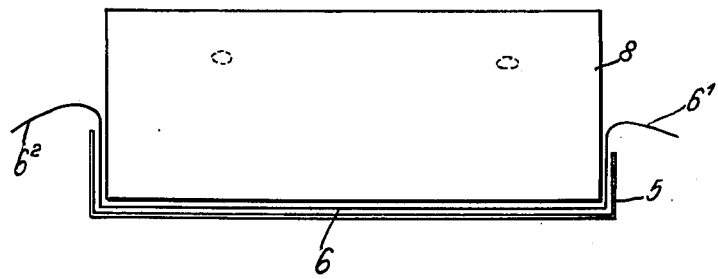
Figure 5 is a sectional view according to Figure 4 through the line V—V of said Figure 4.
Figure 7:
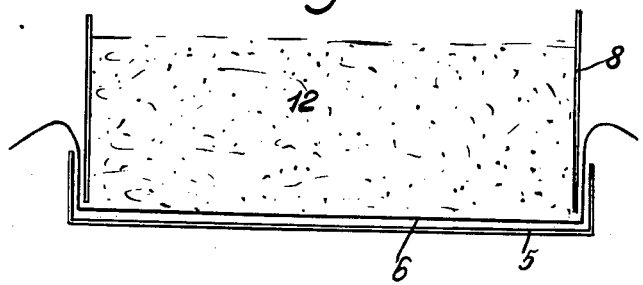
Figure 7 is a sectional view similar to Figure 5 after filling of the mold with the dry fruits.

The outfit made in accordance with the invention and shown by way of example in the appended drawings comprises two different apparatuses or machines, namely:

(1) The mold which receives the dry fruits to be treated;

(2) The press compressing the cake in the mold.

*Mold (Figures 4 to 7)*

This mold is formed of two elements, namely: a gauge 5 provided with eye-bolts 7 and receiving a packing sheet such as the cellulosic sheet 6; a frame 8 provided with eye-bolts 9 encased in the gauge 5 and clamping the packing sheet 6 therein so as to turn up this packing sheet on all sides.

Figure 8:
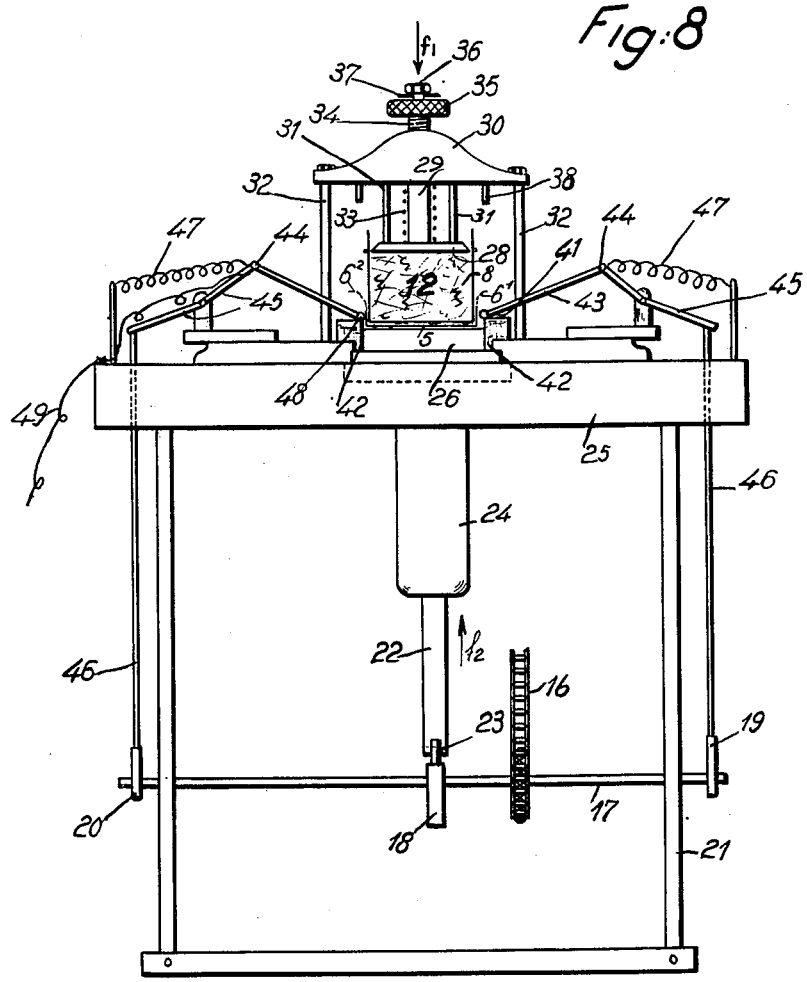
Figure 8 is a front view showing a press made in accordance with the invention and intended for pressing the dry fruit cakes introduced into the molds of Figures 4 to 7.
Figure 9:
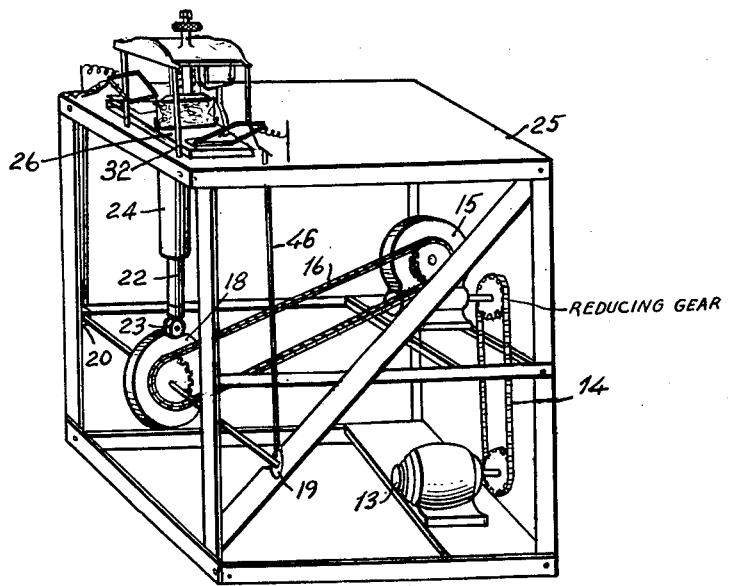
Figure 9 is a perspective view of this press.
Figure 11:
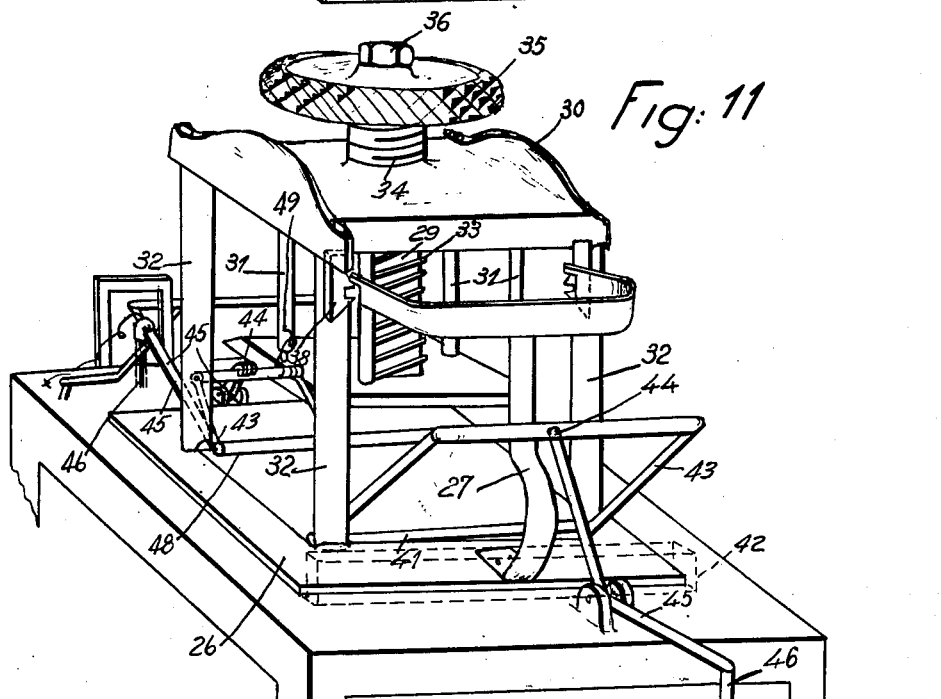
Figure 11 is a perspective view of the upper part of the press (this view showing, more particularly, the upper plate of the press and the rolls for closing the package).
Figure 21:
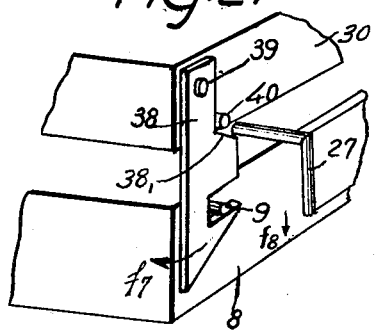
Figures 21 and 22 are two diagrams showing the actuation of a frame-retaining hook through the control fork.

Thus, the packing sheet assumes a position which is well visible in Figure 8; this sheet is pressed on the bottom on the gauge 5 through the frame 8; on the other hand, it largely projects at $6^1$, $6^2$ . . . on the four sides of the gauge and of the frame 8; lastly, this cellulosic sheet forms the bottom of the frame 8 itself.

The gauge 5 shows corners 10 with open angles, which renders possible to free releasing of the cellulosic sheet, forced back by the frame; this makes it possible to turn up the edges of the sheet on all the sides of the gauge for later facilitating the turning down of this sheet and the closure of the packing as explained hereinafter. This arrangement can be seen, more particularly, in Figure 6; one clearly notices therein the fold 11 of the cellulosic sheet 6 which freely projects outside through the open angle 10.

For using the so formed mold one introduces the dehydrated dry fruits or vegetables into the frame 8 (Figure 7); thus, the mass 12 of these fruits comes to rest upon the cellulosic sheet 6 which avoids every contact between this mass and the gauge 5 and, consequently, every adhesion of this mass on the gauge.

The invention also relates to a press shown in Figures 8 to 23 and successively insuring the compression of the dehydrated fruits in the mold, then the folding of the cellulosic sheet on the compressed cake.

This press comprises the following main members:

(1) A control mechanism;

(2) A mechanism for the compression of the cake in the mold and the releasing of the frame from the gauge;

(3) A mechanism for the closure of the packing over the compressed cake.

*Control mechanism*

This mechanism comprises an electric motor 13 (Figures 9 and 10) actuating through a chain transmission 14 a reducing gear 15 which itself actuates through a chain transmission 16 a single driving shaft 17 which is carried in the framework 21 of the press and rotates in this framework.

This driving shaft 17 alone insures the actuation of all the mechanisms of the press. For this purpose it carries:

(1) A cam 18 which actuates the pressure members of the press;

(2) Two cams 19 and 20 which actuate the rolls for the closure of the package.

*Compression mechanism*

This mechanism comprises a piston 22 engaging through a thrust roller 23 a cam 18 of the driving shaft and sliding in a guide 24 fast with the table 25 of the framework.

This piston 22 is itself fast with a lower plate 26 on which the workman comes to lay the whole of the mold, i. e. the unit formed of the frame 8, the gauge 5 and the mass 12 of dehydrated fruits.

The lower plate 26 also carries a fork 27 which is shown in detail in Figure 16 and which is intended for actuating the frame-retaining members, as explained hereinafter.

The lower plate 26 is arranged below an upper plate 28 which shows dimensions which are slightly smaller than those of the frame 8 so as to be able to enter this frame for compressing the mass 12 of dehydrated fruits therein.

The plate 28 is fast with a piston 29 (Figure 12) which slides in the cap 30 of the press. The upper plate 28 is also fast with guiding fingers 31 which also slide in the upper cap 30 of the press.

This cap is secured through four columns 32 on the framework.

This upper plate 28 can also slide freely with the finger 31 in the cap 30 while compressing a spring 33 on this cap.

The displacements of this upper plate 28 are limited by an adjustable stop. This stop is formed of a socket 34 with a knurled actuation knob 35. This socket is screwed into the cap 30 and forms a stop through its end face against the shoulder of the piston 29.

The piston 29 terminates, moreover, in its high part, in a nut 36 and a washer 37 limiting the displacements of this piston and, consequently the displacements of the upper plate 28.

Thus, this device adjusts the maximum displacement of the upper plate 28, in the direction of the arrow $f.1$ and, consequently, the final position assumed by the plate at the end of the movement of compression of the fruits in the mold.

This cap 30 of the press carries the frame-retaining members. The members (Figure 14) are formed of hooks 38 linked at 39 on the cap and the movements of which around this linked connection are limited through stops 40.

These hooks are in number equal to the number of the eyebolts 9 of the frame, i. e. four, namely: two hooks on each longitudinal face of the cap 30 corresponding to both eye-bolts of each longitudinal face of the frame.

The members which make it possible to apply the cellulosic sheet on the upper part of the dried fruit cake and to close it are formed in the following manner:

A first roll 41 rests upon an extension 42 of the lower plate 26. This roll is secured at both its ends to connecting rods 43 forming a stirrup and linking themselves at 44 to the end of a bell crank lever 45; one of the arms of this bell crank lever is urged by a push-rod 46 engaging the cam 19 while the other arm is urged by a return spring 47.

A second roll 48 is arranged symmetrically to the roll 41 and also rests upon an extension 42 of the lower plate 26. This second roll 48 contains heating resistances supplied with electric current by conductors 49. This roll is, like the preceding one, linked at 44 to a bell crank lever 45 with a return spring 47; this bell crank lever 45 is urged by the push-rod 46 engaging the cam 20.

The above described press works in the following manner (Figures 17 to 23):

In the first phase of the movement (Figure 17) the piston 22 and the lower plate 26 fast with this piston move upwards according to the arrow f.3 and raise with them the mold filled with dehydrated fruits. The frame 8 engages the plate 28 which compresses the dehydrated fruits mass 12.

This upper plate 28 also rises according to f.3 while compressing its return spring 33 between the cap 30 of the press and the plate 28.

This displacement continues until the upper plate 28 has effected its stroke, that it is to say until the shoulder of the piston 29 of this plate has engaged the adjustable stop 34 (Figure 12); at this moment the second phase of the operation begins (Figure 18). The piston 29 carrying plate 28 strikes against the adjustable stop 34 in the cap 30 and compresses the dehydrated fruit mass 12 on the bottom of the gauge 5; the piston 22 and the plate 26 continue their stroke according to f.3.

At the end of this movement the eye-bolts 9 of the frame 8 engage the corresponding hooks 38 and are hooked therein.

On the beginning of the third phase (Figure 19) the piston 22 and the lower plate 26 of the press have changed their direction of displacement and move now downwards according to f.4; it is the beginning of the third phase (Figure 19).

The frame 8 of the mold remains still hooked through its eye-bolts 9 to the corresponding hooks 38; accordingly, this frame is released from the dehydrated fruit cake 12 which was compressed during the preceding movement.

Moreover, this movement is facilitated by the upper plate 28. As a matter of fact, this upper plate 28 is pushed downwards according to the arrow f.4 through its spring 33 stretched in the preceding movement; this upper plate acts then as a true piston inside the frame 8 which is suspended and stationary, so that this upper plate pushes back the dried compressed fruit cake 12 and separates this cake from the walls of the frame 8.

The cake which has been thus withdrawn from the mold remains inserted in the gauge 5 and moves downwards with this gauge and the lower plate 26.

Both rolls 41 and 48 were lifted in the preceding movement through the extensions 42 of the lower plate 26. Furthermore, these rolls are actuated through the driving shaft 17 and through the medium of the cams 19 and 20 and of the push-rods 46 and this actuation is developed in synchronism with the displacements of the upper plate 28 so that during the first and second phases of the movement (Figures 17 and 18) both said rolls have been raised simultaneously with the piston 26 and are always in a height which is slightly higher than that of the edge of the gauge.

In all these movements the rolls 41 and 48 are below the edges of the cellulosic sheet 6.

At the moment of the withdrawing of the cake 12 from the mold both rolls 41 and 48 move according to f.5 and f.6 respectively under the action of their control cams 19 and 20. Then the fourth phase of the movement begins (Figure 20). The rolls 41 and 48 turn down the edges of the sheet 6 onto the upper face of the dehydrated fruit cake 12; this turning down is effected immediately after the release of the cake 12 from the frame 8 and, accordingly, without this cake having had time enough for expanding and being deformed.

In these movements both edges of the cellulosic sheet 6 overlap each other exactly. On the other hand, since the roll 48 is heated through electric resistances it heats the cellulosic sheet 6 sufficiently for determining the welding of both edges of this sheet which overlap each other; thus, the cellulosic wrapping 6 forms a sheath completely surrounding the dehydrated and compressed fruit cake.

At the end of the second phase (Figure 18) the fork 27 fast with the lower plate 26 is arranged above the corresponding hooks 38 (Figure 18), these hooks being in engagement with the eye-bolts 9 of the frame 8 and insuring the suspension of this frame.

Figure 22:
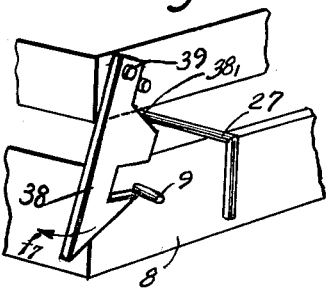
Figure 23:
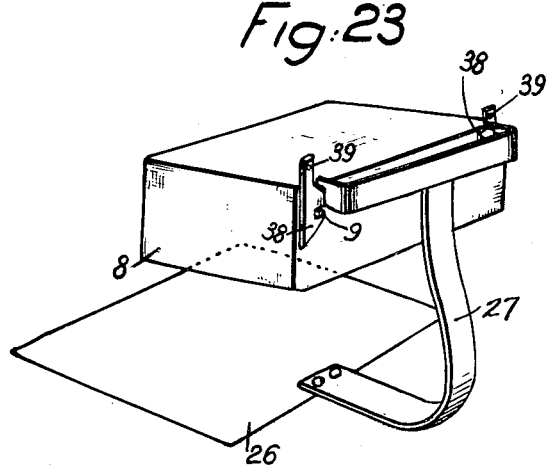
Figure 23 is a perspective view corresponding to Figures 21 and 22 and showing the action of said fork upon said hook.
Figure 10:
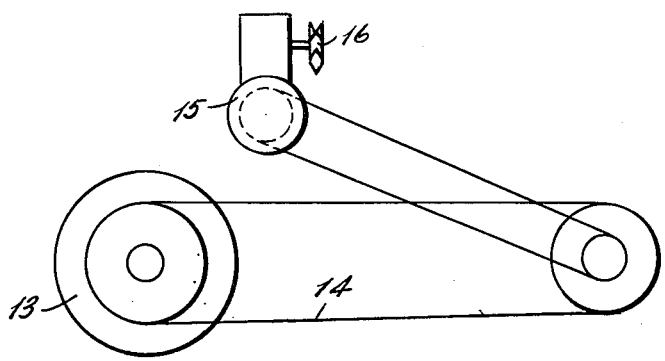
Figure 10 is a side view of the control mechanism of the press.

When the plate 26 moves farther downwards according to f.4 (third and fourth phases) the fork 27 comes to engage the inclined gauge 38' of the hook 38 and causes the latter to turn according to f.7 around its axis 39. Owing to this fact, this hook is released from the eye-bolts 9 of the frame 8 (Figure 22). The so released frame 8 falls then freely through its own weight according to f.8; this makes it possible to collect the frame 8 outside and to place it in position again in a gauge 5 for the introduction of a new batch of dehydrated fruit and the execution of a new series of operations in accordance with the preceding ones.

In the preceding movements the hook 38 is limited in its rocking movements opposing to f.7 through the stop 40.

The press shown in Figures 8 to 23 makes it possible to effect the following operations:

(1) Compression of the mass of fruits in the mold;

(2) Closing of the cellulosic sheet forming a wrapping on the upper face of the compressed cake;

(3) Releasing of the frame from the mold for a new operation.

One thus obtains at the outlet of this press a cake of dried fruits compressed in the gauge 5, the cellulosic sheet completely surrounding the compressed cake on its whole periphery while this sheet is not yet folded at the end of the cake.

The invention was described while assuming that it was applied to a cake covered with a cellulosic wrapping, but it is obvious that the invention could also be applied to the packing of the cake irrespective of the nature of the wrapping sheet which is used.

Likewise, the invention was described while assuming that it was applied to dehydrated fruits or vegetables, however, the invention covers the described devices even when they are used for other products, such as, for example, flour and the like.

I claim:

In an apparatus for the packing of compressible products such as dehydrated fruits and vegetables, a press frame, latch hooks carried at the upper part of said press frame, an upper press plate, a carrier for said upper plate slidably mounted in said frame, an adjustable limit stop carried by the frame for limiting the upward movement of the upper plate relative to the frame, resilient means urging the upper plate downwardly relative to the frame, a lower press plate, means for effecting relative movement between said plates, a mold gauge open at its top and having a bottom supported on the lower press plate, a mold frame open at its top and bottom and of a size to be nested within the gauge with a sheet of wrapping material between the mold gauge and mold frame with its edges raised, said mold frame having internal dimensions slightly greater than those of the upper plate, means on the mold frame positioned to engage and be latched to said hooks, and means carried by the lower plate operable at the end of the lowering of the lower plate to actuate the hooks to release the mold frame.

GEORGES ALBERT DUBOIS.

REFERENCES CITED

The following references are of record in the file of this patent:

UNITED STATES PATENTS

| Number | Name | Date |
|---|---|---|
| 282,046 | Bower | July 31, 1883 |
| 616,452 | Campbell | Dec. 27, 1898 |
| 632,983 | Durozier | Sept. 12, 1899 |
| 1,539,400 | Neusbaum | May 26, 1925 |
| 1,641,042 | Marasso | Aug. 30, 1927 |
| 1,864,775 | Straubel | June 28, 1932 |

FOREIGN PATENTS

| Number | Country | Date |
|---|---|---|
| 215,714 | Great Britain | 1925 |